United States Patent Office 3,118,898
Patented Jan. 21, 1964

3,118,898
IMPROVEMENT IN THE PINACOL-PINACOLONE REARRANGEMENT OF 1,2-DI-LOWER ALKYL-1,2-BIS-PYRIDYL-ETHANE-1,2-DIOLS TO PRODUCE 2,2-DI-LOWER ALKYL-1,2-BIS-PYRIDYL-ETHANE-1-ONES
William Lassiter Yost, Long Valley, N.J., assignor to Ciba Corporation, a corporation of Delaware
No Drawing. Filed Nov. 1, 1961, Ser. No. 149,225
5 Claims. (Cl. 260—296)

The present invention is a new and improved method for the preparation of pinacolone rearrangement products.

2,2-di-lower alkyl-1,2-bis-pyridyl-ethan-1-ones and 1,2-di-lower alkyl-2,2-bis-pyridyl-ethan-1-ones, particularly the compounds of the formulae:

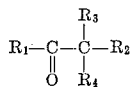

and

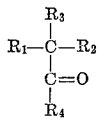

in which each of the groups $R_1$ and $R_2$ stands for 3-pyridyl or 4-pyridyl radical, and each of the groups $R_3$ and $R_4$ represents lower alkyl, particularly methyl, and which are known to inhibit certain functions of the adrenal cortex gland, are prepared by pinacolone rearrangement (treatment with a strong acid) of 1,2-di-lower alkyl-1,2-bis-pyridyl-ethan-1,2-diols, especially of diols of the formula:

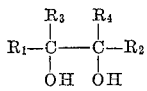

in which $R_1$, $R_2$, $R_3$ and $R_4$ have the previously-given meaning, or of salts thereof. The pinacolone rearrangement is carried out by heating the diol compound with a strong Lewis acid, particularly sulfuric acid, and separating the resulting mixture of ketone compounds into single compounds (U.S. Patent No. 2,966,493 of December 27, 1960). It has been established that the 2,2-di-lower alkyl-1,2-bis-pyridyl-ethan-1-ones, in which pyridyl represents 3-pyridyl or 4-pyridyl, particularly the 2-methyl-1,2-bis-(3-pyridyl)-propan-1-one of the formula:

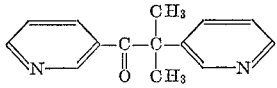

(generic name: methopyrapone) have certain pharmacological advantages over the 1,2-di-lower alkyl-2,2-bis-pyridyl-ethan-1-ones, particularly the 3,3-bis-(3-pyridyl)-butan-2-one of the formula:

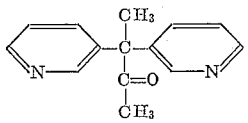

which are simultaneously formed in the pinacolone rearrangement; separation of the resulting mixture and recovery of the desired compounds are, therefore, necessary.

The separation of the reaction mixture into its two constituents may be carried out by fractional crystallization, fractional distillation under greatly reduced pressure, adsorption on an adsorbent and subsequent fractional elution, conversion of the mixture into a mixture of functional derivatives, such as the oximes, separation of the mixture of derivatives into the single derivatives and liberating the desired ketone from its functional derivative, or any other suitable separation procedure. Although separation of the rearrangement mixture can be achieved, the methods are rather cumbersome and a substantial loss of the desired compound cannot be avoided.

An object of this invention is to provide an improved procedure for the preparation of the 2,2-di-lower alkyl-1,2-bis-pyridyl-ethan-1-ones substantially free from the simultaneously formed 1,2-di-lower alkyl-2,2-bis-pyridyl-ethan-1-one.

Another object of this invention is to provide an improved procedure for the preparation of 2,2-di-lower alkyl-1,2-bis-pyridyl-ethan-1-ones in substantially pure form and satisfactory yields.

Another object of this invention is to provide an improved procedure for the preparation of 2,2-di-lower alkyl-1,2-bis-pyridyl-ethan-1-ones in substantially pure form and satisfactory yields, which does not require a separation of a resulting mixture.

Other objects of this invention will become evident from the subsequent description of the invention.

I have now found that the process for the preparation of a 2,2-di-lower alkyl-1,2-bis-pyridyl-ethan-1-one, particularly of a compound of the formula:

in which $R_1$, $R_2$, $R_3$ and $R_4$ have the previously-given meaning, by treatment with a strong acid reagent of a 1,2-di-lower alkyl-1,2-bis-pyridyl-ethan-1,2-diol, particularly of a compound of the formula:

in which $R_1$, $R_2$, $R_3$ and $R_4$ have the previously-given meaning, or of a salt thereof, at an elevated temperature, can be improved unexpectedly by using as the strong acid reagent concentrated sulfuric acid containing sulfur trioxide.

The product, i.e. the 2,2-di-lower alkyl-1,2-bis-pyridyl-ethan-1-one, resulting from such improved procedure is substantially free from a 1,2-di-lower alkyl-2,2-bis-pyridyl-ethan-1-one, particularly from a compound of the formula:

in which $R_1$, $R_2$, $R_3$ and $R_4$ have the previously-given meaning, and, if desired, may be converted into a ketonic derivative, a salt or a salt of a ketonic derivative thereof.

A salt of the starting material is an acid addition salt, particularly an addition salt with a mineral acid, such as hydrochloric, hydrobromic, sulfuric, phosphoric acid and the like.

The concentrated sulfuric acid used as the rearrangement reagent in the process of this invention, contains from about 0.1 percent to about 20 percent by weight, preferably from about 0.5 percent to about 5 percent by weight, of sulfur trioxide. Commercially available preparations, such as oleum, may be used; a reagent containing less than 20 percent sulfur trioxide, may be prepared, for example, by diluting fuming sulfuric acid, containing, for example, 20 percent of sulfur trioxide, with concentrated sulfuric acid (i.e. 96 percent sulfuric acid). A 1:1-mixture of 20 percent fuming sulfuric acid and 96 percent sulfuric acid represents a reagent containing 1.13 percent by weight free sulfur trioxide, whereas a 2:1-mixture of 20 percent fuming sulfuric acid and 96 percent sulfuric acid yields a reagent containing 11.13 percent by weight sulfur trioxide.

The rearrangement takes place at an elevated temperature, particularly at a temperature of from about 40° to about 150°, preferably from about 60° to about 100°; the elevated temperature is maintained until no diol starting material can be detected any longer. The reaction mixture is worked up as usual, i.e. the acidic reaction mixture, preferably after diluting it, is neutralized or basified, for example, by treatment with a base, e.g. sodium hydroxide, ammonium hydroxide, sodium carbonate and the like, and the desired product is extracted from the neutral or basic aqueous mixture with a suitable organic solvent e.g. ethyl acetate, benzene, toluene, cyclohexane, methyl-cyclohexane and the like, or a solvent mixture; the desired material is then recovered by crystallization and is further purified by the usually employed methods.

The preparation of 2-methyl-1,2-bis-(3-pyridyl)-propan-1-one, substantially free from 3,3-bis-(3-pyridyl)-butan-2-one according to the process of this invention, which comprises reacting 2,3-bis-(3-pyridyl)-butan-2,3-diol with sulfuric acid containing from about 0.1 percent to about 20 percent by weight, preferably from about 0.5 percent to about 5 percent by weight, of sulfur trioxide as the strong acid reagent at an elevated temperature, particularly at a temperature of from about 60° to about 100°, represents a preferred procedure. The isolation of the desired 2-methyl-1,2-bis-(3-pyridyl)-propan-1-one may be carried out according to known methods, for example, as previously-shown.

In the process of this invention such starting materials are preferably used which lead to final products mentioned in the beginning as preferred embodiments of the invention.

This is a continuation-in-part application of my application Serial No. 96,111, filed March 16, 1961 now abandoned.

The following examples are intended to illustrate the invention and are not to be construed as being limitations thereon. Temperatures are given in degrees centigrade.

*Example 1*

A total of 24.4 g. of 2,3-bis-(3-pyridyl)-butan-2,3-diol is added to a mixture of 100 g. of fuming sulfuric acid (containing 20 percent of sulfur trioxide) and 50 g. of 96 percent concentrated sulfuric acid while stirring. The resulting solution is maintained at 75° for seven hours and is then allowed to cool to room temperature overnight. The cold solution is poured slowly over crushed ice; the aqueous solution is made basic (pH about 10) with a 50 percent solution of sodium hydroxide in water. The oily organic material is extracted with ethyl acetate, the organic extract is washed with a saturated aqueous sodium chloride solution, dried over sodium sulfate and evaporated to dryness. The residue (9.6 g.) is dissolved in a mixture of 2.6 ml. of diethyl ether and 1.6 ml. of pentane; the solution is seeded and allowed to stand at 4° overnight. The solid material is filtered off and washed with a 1:1-mixture of diethyl ether and pentane to yield 8.39 g. of 2-methyl-1,2-bis-(3-pyridyl)-propan-1-one, M.P. 45–49°, which is free from any substantial amount of 3,3-bis-(3-pyridyl)-butan-2-one.

In the above example, 2,3-bis-(3-pyridyl)-butan-2,3-diol may be replaced by 3,4-bis-(3-pyridyl)-hexan-3,4-diol or 2,3-bis-(4-pyridyl)-butan-2,3-diol as the starting materials; upon treatment with concentrated sulfuric acid containing sulfur trioxide these starting materials yield the 2-ethyl-1,2-bis-(3-pyridyl)-butan-1-one and the 2-methyl-1,2-bis-(4-pyridyl)-propan-1-one (M.P. 75–76°) substantially free from the 4,4-bis-(3-pyridyl)-hexan-3-one and 3,3-bis-(4-pyridyl)-butan-2-one, respectively, which contaminate the reaction product of the pinacolone rearrangement procedure described in the art.

*Example 2*

A solution of 42480 g. of 2,3-bis-(3-pyridyl)-butan-2,3-diol in a mixture of 133000 g. of fuming sulfuric acid (containing 20 percent of sulfur trioxide) and 133000 g. of concentrated sulfuric acid (96 percent) is heated at 90–95° for 3½ hours. The reaction mixture is allowed to cool overnight and is then poured onto ice. The aqueous acidic solution is made alkaline with a 27 percent aqueous solution of ammonium hydroxide; the oily product is extracted with toluene, and the organic solution is decolorized by treatment with charcoal, and evaporated. The crude product is dissolved in a benzenemethylcyclohexane mixture, treated with a small amount of aluminum oxide and then chilled. The resulting crystalline 2-methyl-1,2-bis-(3-pyridyl)-propan-1-one is filtered off, washed with methylcyclohexane and dried to yield 15600 g. of pure product, which melts at 50–51° and contains less than 0.25 percent of 3,3-bis-(3-pyridyl)-butan-2-one.

*Example 3*

A total of 44600 g. of the crude product obtained from a rearrangement procedure carried out according to Example 2, is dissolved in 10 volumes of a toluene-methylcyclohexane solution at 40–50°, and treated for one hour with a charcoal preparation. The solid material is filtered off, the filtrate is slowly cooled to 27°, seeded, then cooled with water and later with brine. The crystalline 2-methyl-1,2-bis-(3-pyridyl)-propan-1-one is filtered off and dried at 25–30° to yield 35000 g. of the pure desired product. The residue from the mother liquors is again treated with sulfuric acid containing sulfur trioxide and another 3900 g. of pure 2-methyl-1,2-bis-(3-pyridyl)-propan-1-one can be recovered; total yield: 38900 g.

What is claimed is:

1. In the process for the preparation of 2,2-di-lower alkyl-1,2-bis-pyridyl-ethan-1-ones by treatment with a strong acid reagent of a member selected from the group consisting of a 1,2-di-lower alkyl-1,2-bis-pyridyl-ethan-1,2-diol and a salt thereof, the improvement which comprises using as the strong acid reagent concentrated sulfuric acid containing sulfur trioxide.

2. Process according to claim 1, which comprises using as the strong acid reagent concentrated sulfuric acid containing from about 0.1 percent to about 20 percent of sulfur trioxide.

3. Process according to claim 1, which comprises using as the strong acid reagent concentrated sulfuric acid containing from about 0.5 percent to about 5 percent of sulfur trioxide.

4. Process according to claim 1, which comprises using 2,3-bis-(3-pyridyl)-butan-2,3-diol as the starting material.

5. Process for the preparation of 2-methyl-1,2-bis-(3-pyridyl)-propan-1-one, which comprises treating 2,3-bis-(3-pyridyl)-butan-2,3-diol with concentrated sulfuric acid containing sulfur trioxide.

References Cited in the file of this patent

UNITED STATES PATENTS

| | | |
|---|---|---|
| 2,966,493 | Allen et al. | Dec. 27, 1960 |
| 2,976,282 | Runge | Mar. 21, 1961 |

OTHER REFERENCES

Ingold: "Structure and Mechanism in Org. Chem." (Cornell), pages 202–4, 300 (1953).

Royals: "Advanced Org. Chem." (Prentice-Hall), 252–3 (1954).

UNITED STATES PATENT OFFICE
CERTIFICATE OF CORRECTION

Patent No. 3,118,898                      January 21, 1964

William Lassiter Yost

It is hereby certified that error appears in the above numbered patent requiring correction and that the said Letters Patent should read as corrected below.

Column 3, line 37, for "Serial No. 96,111" read -- Serial No. 96,112 --.

Signed and sealed this 9th day of June 1964.

(SEAL)
Attest:

ERNEST W. SWIDER
Attesting Officer

EDWARD J. BRENNER
Commissioner of Patents